March 7, 1967 L. HOHOFF 3,307,249
GASKET INSERTING TOOL
Filed March 26, 1965
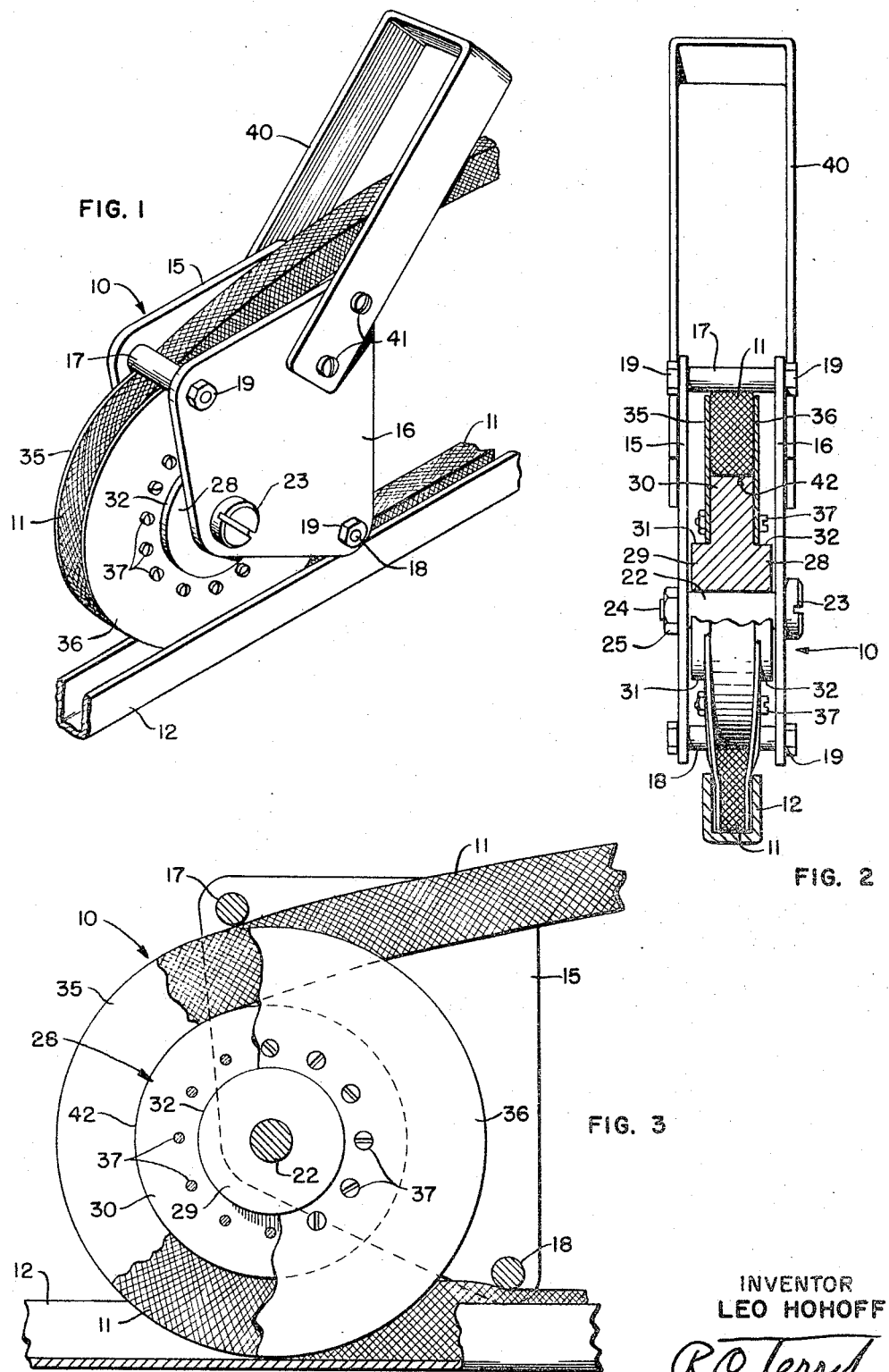
INVENTOR
LEO HOHOFF
BY R.C. Terry
ATTORNEY United States Patent Office 3,307,249
Patented Mar. 7, 1967

3,307,249
GASKET INSERTING TOOL
Leo Hohoff, Park Ridge, Ill., assignor to Teletype Corporation, Skokie, Ill., a corporation of Delaware
Filed Mar. 26, 1965, Ser. No. 442,919
3 Claims. (Cl. 29—235)

This invention relates to a gasket inserting tool and more particularly to a device for inserting radio frequency emission inhibiting gaskets in the cabinets of telecommunications devices.

Modern day security requirements dictate that radio frequency emissions from telecommunications cabinets be held to an absolute minimum. To this end it has become desirable to ground the cabinets of these devices and to seal the openings around their doors, etc. with grounded metal gaskets. These gaskets are typically in the form of a loosely woven rope formed from small diameter conductive wires which are held in channels in the cabinets by means of friction and compression. Inserting these gaskets in their channels has proven to be very difficult and accordingly a need has arisen for gasket inserting tools. It is necessary that these gasket inserting tools be simple and easy to operate or else the cost of inserting the gaskets in their channels becomes high.

Accordingly, an object of this invention is to reduce the cost of inserting metal gaskets in cabinets.

Another object of this invention is to improve the art of inserting gaskets in channels.

A further object of this invention is to provide a gasket inserting tool which is comprised of a small number of inexpensive parts and which is simple to operate.

According to the preferred embodiment of the invention these and other objects are achieved by providing a device in which a pair of resilient metal flanges are attached to a cylinder that is rotatably mounted in a frame. The axial width of the portion of cylinder which is between the flanges is substantially equal to the width of the gasket being inserted and the difference between the radii of the flanges and the radius of the cylinder is substantially equal to the height of the gasket being inserted. In use the gasket is placed between the flanges and the flanges are flexed and rotated in the channel into which the gasket is to be placed. A pin mounted on the frame forces the gasket into engagement with the cylinder and the flanges grip the gasket so that as the flanges and the cylinder are rotated the flanges move the gasket into the channel while the cylinder assures that the gasket is fully seated in the channel. Once the gasket is fully seated a second pin strips it from between the flanges thus leaving the gasket correctly seated in the channel.

A more complete understanding of the invention may be had by referring to the following detailed description when taken in conjunction with the drawings wherein:

FIG. 1 is a front perspective view of a device embodying the invention;

FIG. 2 is an end view of the device in which parts have been broken away more clearly to illustrate certain features of the invention, and FIG. 3 is a side view in which parts have been broken away more clearly to illustrate certain features of the invention.

Referring now to the drawings, wherein like reference numbers designate like parts throughout the several views, with particular reference being had to FIG. 1, there will be seen a gasket inserting tool 10 for inserting a gasket 11 into a channel 12. The gasket 11 is in the form of a rather loosely woven wire rope. The wires which comprise the gasket are of small diameter and are formed from a radiation dissipating material such as steel. Gaskets of this type are used to seal gaps between mating parts, such as doors, etc., in telecommunications cabinets so that the cabinets form a completely grounded enclosure around the parts which they house. A completely grounded enclosure around a telecommunications device assures that radio frequency emission generated by the device will not escape from the cabinet to be detected at some remote point.

A typical manner of assembling gaskets in the cabinets of electrical devices is to provide one part of a set of mating parts with a channel such as the channel 12 and to provide the other of the mating parts with a flush surface positioned opposite the channel. A gasket such as the gasket 11 is then inserted in the channel in such a way that it protrudes above the upper surface of the flanges of the channel. When the mating parts are brought into engagement the gasket is compressed between the flush surface of one of the mating parts and the channel of the other of the mating parts. This action assures that good electrical contact will be made between the gasket and each of the mating parts.

The gasket inserting tool 10 is provided to aid in the insertion of gaskets, such as the gasket 11, in channels, such as the channel 12. The gasket inserting tool 10 is comprised of a pair of side plates 15 and 16 which are held in a spaced parallel relationship by a pair of pins 17 and 18. These pins 17 and 18 each have an enlarged center portion and reduced threaded portions at each of their ends. This structure provides shoulders at each end of the pins 17 and 18 and allows the use of nuts 19 which cooperate with the shoulders of the pins 17 and 18 to secure the side plates 15 and 16 with respect to each other.

Mounted between the side plates 15 and 16 is a shaft 22 which has a head 23 and a reduced threaded portion 24. The shaft 22 is secured between the side plates 15 and 16 by the cooperation of a nut 25 and the head 23. Rotatably mounted on the shaft 22 and between the side plates 15 and 16 is a cylinder 28. This cylinder has in contact with the shaft 22 a wide portion 29 and has radially spaced from the shaft 22 a narrow portion 30. The difference between the thicknesses of the wide portion 29 and the narrow portion 30 provides a pair of annular shoulders 31 and 32 one of which is located at each end of the cylinder 28. Mounted on the shoulders 31 and 32 are a pair of flanges or discs 35 and 36 which are secured to the narrow portion 30 of the cylinder 28 by means of a plurality of threaded fasteners 37. The flanges 35 and 36 are constructed from a resilient, flexible material such as nickel, silver and are used to grip the gasket 11 as it is inserted in the channel 12.

In operation the leading end of the gasket 11 is inserted between the flanges 35 and 36 at a point approximately directly above the axis of the shaft 22. The flanges 35 and 36 are axially flexed and forced into engagement with the channel 12 so that the outermost edges of the flanges 35 and 36 are in frictional engagement with the bottom of the channel 12. A handle 40, which is secured to the side plates 15 and 16 by means of fasteners 41, is then used to push the gasket inserting tool 10 along the length of the channel 12. Since the flanges 35 and 36 are frictionally engaged with the bottom of the channel 12, this action causes the flanges and, therefore, the cylinder 28 to rotate about the shaft 22. This brings the gasket 11 into engagement with the pin 17 which is positioned to force the gasket 11 into engagement with the outer surface 42 of the narrow portion 30 of the cylinder 28. The difference between the radii of the flanges 35 and 36 and the radius of the outer surface 42 of the cylinder 28 is approximately equal to the height of the gasket 11. Therefore, as pin 17 forces the gasket into engagement with the outer surface 42, the gasket 11 becomes almost completely enclosed by the flanges 35 and 36.

Further movement of the gasket inserting tool 10 along the length of the channel 12 will cause the portion of the flanges 35 and 36 which grips the leading end of the gasket 11 to be rotated into the channel 12. Since the narrow portion of the cylinder 28 is of approximately the same width as the channel 12, it is necessary that the side of the flanges 35 and 36 be pushed together slightly as the flanges enter the channel 12. This action causes the gasket 11 to be compressed slightly between the flanges 35 and 36 as it enters the channel 12 while the surface 42 of the cylinder 28 assures that the gasket 11 will be fully seated in the channel 12.

Continued movement of the gasket inserting tool 10 along the length of the channel 10 will cause further rotation of the flanges 35 and 36 and the cylinder 28 and this in turn will cause the gasket 11 to become fully seated in the channel 12. Once it is fully seated the gasket 11 is stripped out from between the flanges 35 and 36 and directed under the pin 18 which is positioned to assure not only the removal of the gasket from between the flanges 35 and 36 but also the continued full seating of the gasket in the channel 12. Thus, the gasket inserting tool 10 is not only used to insert the gasket into the channel but also is used to assure that the gasket will remain fully seated after it has been placed in the channel by the flanges 35 and 36.

From the foregoing it should be understood that the gasket inserting tool 10 may not only be used to insert the leading end of a gasket into the channel but may also be continuously operated to insert the entire length of a gasket into a channel and to insure that the entire length of the gasket will be fully seated in the channel. Each suceeding length of gasket is forced into engagement with the outer surface 42 of cylinder 28 by the pin 17 thus assuring that it will be gripped by the flanges 35 and 36. After the gasket has been fully seated in the channel by the flanges 35 and 36 and the surface 42 of the cylinder 28, the pin 18 removes the gasket from between the flanges 35 and 36 and assures that the gasket will remain fully seated.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A tool for inserting gaskets in a channel including:
   a pair of side plates having a generally quadrilateral configuration;
   a cylinder rotatable between the side plates;
   a pair of flanges one mounted on each end of the cylinder for frictional engagement with the bottom of the channel into which the gasket is to be inserted; and
   a pair of pins for maintaining the side plates in spaced parallel relation one to the other, one of said pins positioned at a corner of the side plates and the other of said pins being positioned at the opposite corner of the side plate so that a gasket having been inserted between the flanges near the point on the circumference of the cylinder which is diametrically opposite from the point of contact of the flanges and the bottom of the channel will be forced into engagement with the cylinder by said one of the pins, will be rotated by the flanges into the channel, will be forced by cylinder into engagement with the bottom of the channel and will be stripped by said other of the pins from between the flanges after being fully seated in the channel by the cylinder.

2. A gasket inserting tool of the type wherein a pair of rotatably mounted disks receive a gasket, compress the gasket and rotate the gasket into a channel including:
   at least one plate member having at least three corners;
   means mounted on the plate member at one of the corners for rotatably supporting the disks;
   means mounted on the plate member at a second of the corners for forcing a gasket into engagement with the disks, and
   means mounted on the plate member at a third of the corners for removing the gasket for engagement with the disks after the disks have rotated the gasket into the channel.

3. The gasket inserting tool according to claim 2 wherein the three corners form an angle and wherein the disks are rotatably supported at the corner forming the vortex of the angle.

References Cited by the Examiner

UNITED STATES PATENTS

| 2,761,199 | 9/1956 | Allen | 29—235 |
| 3,200,482 | 8/1965 | Brown | 29—235 |

References Cited by the Applicant

UNITED STATES PATENTS

| 754,175 | 3/1904 | Tynan. |
| 816,952 | 4/1906 | Webster. |
| 1,621,239 | 3/1927 | Denmire. |

WILLIAM FELDMAN, *Primary Examiner.*

J. C. PETERS, *Assistant Examiner.*